United States Patent
Wötting et al.

[11] Patent Number: 6,156,238
[45] Date of Patent: Dec. 5, 2000

[54] LIQUID PHASE-SINTERED, ELECTRICALLY CONDUCTIVE AND OXIDATION-RESISTANT CERAMIC MATERIAL, A PROCESS FOR PRODUCING IT AND ITS USE

[75] Inventors: Gerhard Wötting, Coburg; Jürgen Hennicke, Rödental, both of Germany

[73] Assignee: Bayer AG, Leverkusen, Germany

[21] Appl. No.: 09/017,783

[22] Filed: Feb. 3, 1998

[30] Foreign Application Priority Data

Feb. 10, 1997 [DE] Germany .................. 197 04 910

[51] Int. Cl.[7] ................................................ H01B 1/06
[52] U.S. Cl. .................... 252/519.1; 252/518.1; 252/516; 252/591.14; 252/591.12; 252/521.1; 252/521.5; 252/520.22; 252/500
[58] Field of Search ........................ 252/504, 507, 252/591.1, 591.12, 520.22, 521.5, 516, 518.1, 500, 519.14, 521.1

[56] References Cited

U.S. PATENT DOCUMENTS 3,890,250  6/1975  Richerson ................. 252/516

FOREIGN PATENT DOCUMENTS

| 322745 | 7/1989 | European Pat. Off. . |
|---|---|---|
| 2412 339 | 8/1973 | Germany . |
| 38 40 171 | 5/1990 | Germany . |
| 195 28 525 | 2/1997 | Germany . |
| 1 071 185 | 6/1967 | United Kingdom . |
| 2 109 810 | 6/1983 | United Kingdom . |
| 2 125 066 | 2/1984 | United Kingdom . |
| 2 142 343 | 1/1985 | United Kingdom . |
| 2 177 421 | 1/1987 | United Kingdom . |
| 2 302 335 | 1/1997 | United Kingdom . |

OTHER PUBLICATIONS

Materials Science and Engineering, A127 (1990) 115–122, "Oxidation Behaviour of Electroconductive Si3N4–TiN Composites", A. Bellosi, Jan. 18, 1990.

Primary Examiner—Yogendra Gupta
Assistant Examiner—D. G. Hamlin
Attorney, Agent, or Firm—Connolly Bove Lodge & Hutz LLP

[57] ABSTRACT

This invention relates to a liquid phase-sintered, electrically conductive and oxidation-resistant ceramic material, to a process for producing it and to its use.

3 Claims, 1 Drawing Sheet

LIQUID PHASE-SINTERED, ELECTRICALLY CONDUCTIVE AND OXIDATION-RESISTANT CERAMIC MATERIAL, A PROCESS FOR PRODUCING IT AND ITS USE

This invention relates to a liquid phase-sintered, electrically conductive and oxidation-resistant ceramic material, to a process for producing it and to its use.

For many applications in engineering there is a need for an electrically conductive ceramic which at the same time has a high resistance to abrasion and corrosion, good mechanical properties up to high temperatures and a low weight (compared with metallic materials). $Si_3N_4$ materials exhibit a particularly favourable combination of the last-mentioned properties, which is why they are employed in many fields as components which can be subjected to high mechanical, thermal, chemical and/or abrasive loadings. $Si_3N_4$ materials are generally electrical insulators, however, and they are difficult to machine in their dense state. Diverse work has been carried out on this topic, aimed at obtaining an electrical conductivity by adding electrically conductive secondary phases, such as TiN, TiC, Ti(C,N) and/or $TiB_2$ to $Si_3N_4$ base materials. These types of composites have the advantage that if their electrical conductivity is sufficient, spark-erosion machining can be performed, by means of which very complex shapes and profiles can be produced. However, these materials can also be employed directly as solid high-temperature heaters. The thermal stability of these composites is thus of very great importance, since they are subjected to high temperatures in an oxidising environment during machining or in use.

The materials of this type which have been available hitherto have still been perceptibly deficient in this respect, so that an improvement in the behaviour of the material for said specific applications is indispensable. This is described, for example, in Materials Science and Engineering, A127 (1990), pages 115–122. In this article, mixtures of $Si_3N_4$ with $Y_2O_3$ and $Al_2O_3$ as sintering additives were mixed with increasing amounts of TiN powders, compacted by hot-pressing, and the relevant mechanical and electrical properties and oxidation behaviour were determined between 700 and 1300° C. in air. When $\geq 230\%$ by volume TiN was added, an electrical conductivity of $\geq 1$ S/m was obtained, which is sufficient for spark-erosion machining.

After a 10-hour oxidation treatment in air at 1000° C., the material containing 30% by volume TiN already exhibited a weight increase of about 0.7 mg/cm², however, and with increasing TiN content the oxidation-resistance became even less. This is an unacceptable instability both for spark-erosion machining and for applications at elevated temperatures.

A further significant disadvantage which this group of materials has exhibited hitherto is that the sinterability to form a dense material is severely impaired by the addition of said secondary phases, so that it is generally only possible to produce them by hot-pressing or HIP methods.

An electrically conductive, sintered ceramic body with an $Si_3N_4$ or SiAlON matrix is known from EP-A-322 745 which contains a carbide, nitride, oxide or composite compounds thereof with transition metals of groups IVa-VIa of the periodic table as the first conductive material, and SiC as the second conductive material. Sintering additives and additives for forming the SiAlON mixed crystal structure comprise $Al_2O_3$, AlN, oxides of group IIIa of the periodic table including the rare earths, and MgO. Even with these materials, however, either the electrical conductivity, or the oxidation-resistance, which has values of around 0.05 mg/cm² as measured as the weight increase in mg/cm² after annealing in air at 1100° C., is unsatisfactory.

A material comprising 50% by volume SiAlON, 30% by volume TiN and 20% by volume SiC does in fact exhibit the desired conductivity, but on the other hand has an oxidation behaviour which is completely unsatisfactory.

Conductive materials produced by sintering, which have a good spectrum of properties as regards both the characteristic mechanical properties of these materials and their oxidation-resistance, and which can be used as a highly stressed component even at elevated temperatures and under an oxidising atmosphere, have hitherto not been known.

The object of the present invention was therefore to provide materials with this property profile.

It has now been found that liquid phase-sintered, electrically conducting and oxidation-resistant ceramic materials of general formula

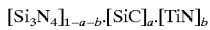

wherein a=0.1 to 1, b=0 to 0.5 preferably b=0,05 to 0.5, and (a+b)$\geq$0.4, and sintering aids from the group comprising $Y_2O_3$, rare earth oxides, $Al_2O_3$, $Sc_2O_3$, $TiO_2$ and $ZrO_2$, exhibit the desired property profile.

The present invention therefore relates to a liquid phase-sintered, electrically conducting and oxidation-resistant ceramic material based on the general composition

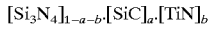

wherein a=0.1 to 1, b 0 to 0. 5 and (a+b)$\geq$0.4, and sintering aids from the (group comprising $Y_2O_3$, rare earth oxides, $A_2O_3$, $Sc_2O_3$, $TiO_2$ and $ZrO_2$, which has a specific electrical conductivity at room temperature of $\geq$0.1 S/m and an oxidation-resistance characterised by a weight increase of $\leq$0.05 mg/cm² after exposure to air for 100 hours a1000° C.

Figure 1A:
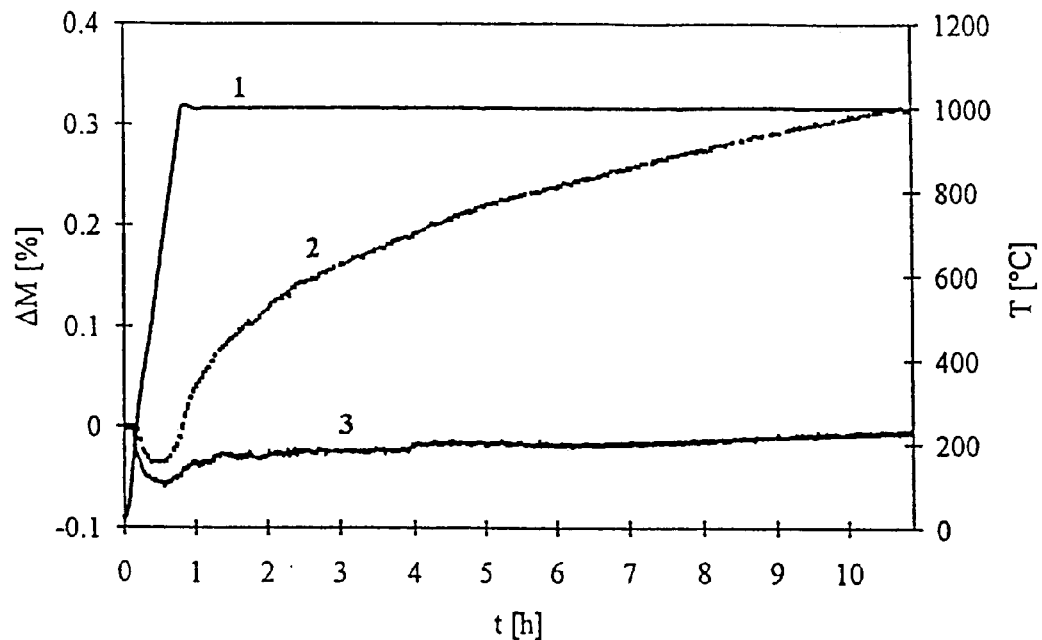
FIG. 1 is a graph plotting the change in weight of material with time as a function of temperature for samples at a constant annealing temperature of 1000° C. after the heat-up phase.
FIG. 1b is a graph plotting the change in weight of material with time as a function of temperature for samples at 1300° C.

In one embodiment of the invention, the material may also contain up to 10% by weight of TiC.

The weight increase of the material according to the invention after exposure to air for 100 hours at 1300° C. is preferably $\leq$0.8 mg/cm².

In a further preferred embodiment of the invention, the volume of the sintering additives, together with the volume of the $SiO_2$ resulting from the oxygen content of the $Si_3N_4$ powder and/or of the SiC powder used and together with the $TiO_2$ resulting from the oxygen content of the TiN powder used, amounts in total to $\leq$15% by volume of the sintered material, wherein at room temperature the material has an average bending strength of $\geq$800 MPa, a fracture toughness of $\geq$6 MPa. $m^{1/2}$ and a hardness HV10 of $\geq$15 GPa.

In this material, SiC preferably acts as an agent for increasing the oxidation-resistance in materials, so that the material can thereby be used in an oxidising atmosphere above 1000° C.

The material according to the invention can thereby be machined by spark-erosion.

The present invention further relates to a process for producing the material according to the invention, wherein, corresponding to the general composition

[Si3N4]$_{1-a-b}$[SiC]$_a$·[TiN]$_b$, wherein a=0.1 to 1, b=0 to 0.5 and (a+b)≧0.4, corresponding amounts of Si$_3$N$_4$ and/or SiC starting components, which each have a fineness of 98% by volume <2 μm, and/or TiN, which has a fineness of 98% by volume <5 μm, and the sintering additives, are intensively mixed, shaped, and are converted into dense materials with residual porosities of ≦1% by volume by sintering in a nitrogen atmosphere at ≦100 bar.

The materials are preferably sintered to form dense materials at temperatures ≦1780° C. under 1 bar N$_2$ or at T≦2000° C. under an elevated N$_2$ pressure.

In the process according to the invention, the TiN starting component is preferably used as nanofine TiN with a particle size of 98% by volume <100 nm and/or as an amorphous Ti(C)N precursor with a maximum C content of 20% by weight.

The present invention also relates to the use of the material according to the invention for tools for machining and for apparatuses, particularly metal extrusion press dies with complex profiles, and for press tools, as well as for glow plugs, level sensors, heater rods and ignition devices.

The following examples serve to explain the invention without having a limiting effect thereon.

EXAMPLES

Examples of Embodiments

The exact amounts of the individual components used, as well as the properties of the materials, are listed in Table 1.

Example 1 (batches nos. #1–#4), Comparative Examples

A reference batch which sintered well (#1, Table 1), based on Si$_3$N$_4$ (BAYSINID-ST, obtainable from Bayer AG, Germany, specific surface=11 m$^2$/g, O content=1.4% by weight, d-98<2 μm), finely dispersed Y$_2$O$_3$, obtainable under the name Grade C from H. C. Starck, Germany, and Al$_2$O$_3$, obtainable under the name CT 3000 from Alcoa, Germany, was prepared in a planetary mill using Si$_3$N$_4$ grinding vessels and grinding balls of 4 mm diameter. The solids/grinding ball/liquid ratio was 1:1 1.2.5, n-propanol was used as the grinding liquid, and the duration of grinding at 150 rpm was 15 hours. The ground suspension was concentrated, sieved to <400 μm, pressed into samples and sintered for 2 hours in an inert atmosphere at 1780° C. and 1 bar N$_2$.

The total oxygen content of the prepared batches was determined by means of an NO analyser manufactured by Heraeus, Germany. The oxygen content of the sintering additives (="O cont. adds." in Table 1) was a calculated value based on the stoichiometry of the oxides used. The difference between these two values constituted the O content which was introduced via the non-oxides, that which was introduced as an integral constituent of the raw materials, and that which was introduced by oxygen absorption during preparation. This was converted to proportions by weight of SiO$_2$ (and subsequently of TiO$_2$ also), and was added to the oxide additives. The volume of the two groups of substances, and from this the volume fraction in percent (="sec. phase vol., vol %" in Table 1), was calculated by dividing by the individual densities of the non-oxide components and of the oxide components also.

Standard bending test specimens were prepared from the sintered samples, and the bending strength was determined under 4-point loading with support spacings of 40/20 mm according to DIN 51 110. The fracture toughness was determined on polished sections of the samples by the crack length determination method, using the evaluation formula according to Niihara. The hardness was also determined on polished sections by the Vickers method according to DIN 50 133. The oxidation behaviour was determined on disc-shaped platelets of diameter 50 mm and thickness 5 mm (=47 cm$^2$ surface area), by annealing the samples for up to 100 hours in the laboratory atmosphere at 1000° C. and at 1300° C. After cooling to room temperature, the change in weight in mg was determined and was given with respect to the sample area, i.e. in mg/cm$^2$.

The electrical conductivity was determined on the same disc-shaped platelets in their sintered, ground state. Pt electrodes comprising a guard ring were deposited by sputtering according to DIN 53 842, and the determination was made as an alternating current measurement using a measuring bridge manufactured by Wayne-Kerr, GB.

The values obtained for this base batch are listed in Table 1. They fall within the range of properties which can usually be obtained with this material and with this process.

In order to obtain an electrical conductivity, the Si$_3$N$_4$ fraction of the reference batch was reduced, and TiN (obtainable under the name Grade C from H. C. Stack, Germany; specific surface=4 m$^2$/g, oxygen content=1.6% by weight, d-98<5 μm) was added. Preparation was effected as described above, firstly of Si$_3$N$_4$ only and the oxide sintering additives. After grinding for a duration of 10 hours, the TiN was added and ground for a further 5 hours. Further processing and testing were effected as stated above. The TiN concentration was increased from 20% by weight (#2, Table 1) through 30% by weight (#3, Table 1) to 40% by weight (#4, Table 1). The results obtained are given in Table 1.

It can be seen that in the SiC-free material the addition of TiN has a pronounced effect on the mechanical properties. At 40% by weight TiN, the target was reached of obtaining an electrically conductive, spark-erodable material (electrical conductivity ≧0.1 S/m). However, the materials containing TiN became more unstable towards oxidation with increasing TiN content.

Example 2 (batches no. #5, not according to the invention, and #6–8, according to the invention)

In attempts to improve the oxidation-resistance whilst retaining the desired level of electrical conductivity, 20% by weight TiN in batch #4 was replaced by SiC, obtainable under the name UF 25 from H. C. Starck, Germany: specific surface=25 m$^2$/g, O content=1.8% by weight, d-98<2 μm. The process conditions were selected so that they were identical to those listed in example 1. This material #5 only had a low electrical conductivity, but its oxidation-resistance was surprisingly of a level which was better by orders of magnitude, and therefore fell within the range aimed at. In order also to increase the conductivity again to the level required for spark-erosion machining, the TiN content was increased afresh with a simultaneous decrease of the SiC addition, in order to obtain Si$_3$N$_4$ as the phase dominating the microstructure. The results for this batch #6 show that at 30% by weight TiN and 15% by weight SiC the targeted conductivity of ≧0.1 S/m is obtained; a further increase of the TiN content results in a conductivity which is further improved.

Figure 1B:
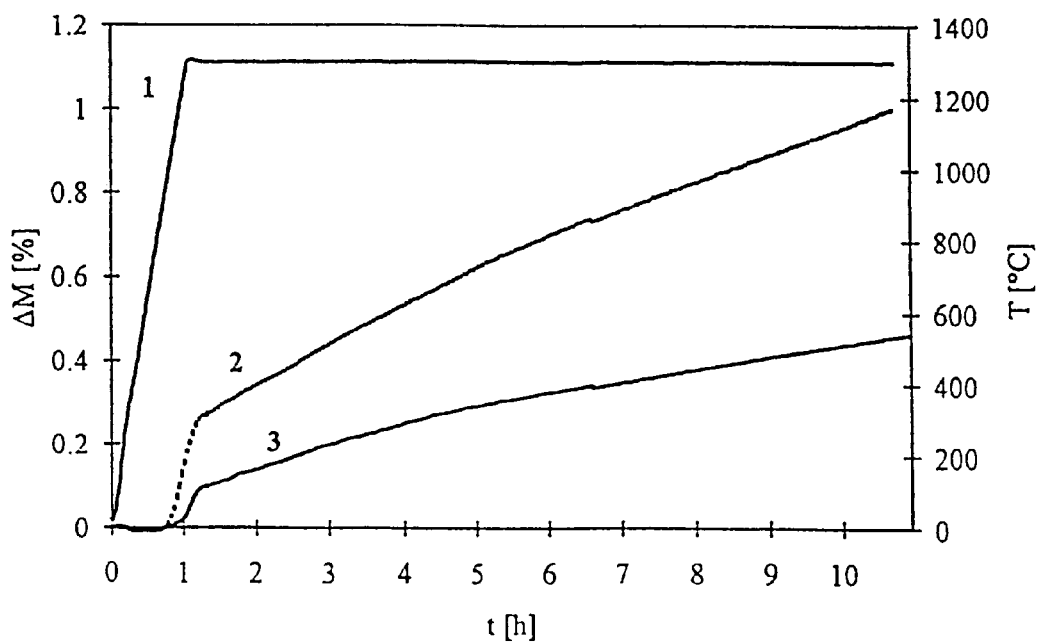

The success which was obtained as regards improved oxidation-resistance of the $Si_3N_4$-based ceramic according to the invention was demonstrated by recording the change in weight of material #6 with time by means of a thermobalance. The electrically conductive SYAlON of the British Company Lucas-Cookson was used as a material for comparison with variant #6 according to the invention (FIGS. 1a and 1b). These Figures show the change in weight ΔM in % with time t in hours as a function of temperature in ° C. FIG. 1a shows the behaviour of the samples at a constant annealing temperature of 1000° C. after the heat-up phase. FIG. 1b shows the corresponding behaviour at 1300° C. Each test was performed in air. Curve 1 in each case shows the temperature progression of the test with time, curve 2 shows the change in weight (ΔM in %) of the comparison material, and curve 3 shows the change in weight (ΔM in %) of material #6 according to the invention. It can be seen that at 1000° C. the material according to the invention exhibits practically no weight increase due to oxidation over the 10-hour duration of the test. The excursion of the weight change curve at the start of the test is an expulsion effect in the thermobalance due to the rapid heat-up. The identical test at 1300° C. gave a weight increase due to oxidation of 0.45% by weight, which, with respect to the 3×4×15 mm sample which was used, equates to a weight increase per unit area of 0.2 mg/cm². A corresponding 100-hour annealing test using disc-shaped samples gave a value of 0.5 mg/cm², which is significantly better than the values reported previously and emphasises the level of invention.

In attempts to improve the electrical conductivity even further, the TiN content was further increased and the SiC (and $Si_3N_4$) content was reduced (batches #7 and #8). It was surprisingly shown in these tests that, despite the increased TiN content, which resulted in the desired increase in electrical conductivity, the oxidation remained at a very low level. At the same time, it was shown that even a 10% addition of SiC was sufficient to keep oxidation at a very low level, i.e. even material #8 still exhibited a surprisingly good oxidation-resistance at 1300° C. The other mechanical properties were also of a level which made the targeted use possible, wherein, moreover, the batches could be densified by sintering.

Example 3 (batch nos. #9 to #13, wherein #9, #12 and #13 are according to the invention)

These variations were made in order to check the effect of process parameters and raw material quality on the production process and on the properties. The process conditions were selected so as to be identical to those of example 1, with the exception of the specific alterations described in each case. Thus batch #8 was sintered at 1900° C. under 100 bar $N_2$ and the resulting material #9 was analysed. It can be seen from Table 1 that the mechanical properties and the electrical conductivity are thereby improved further and the oxidation-resistance remained at the low level according to the invention.

In test #10, a coarser TiN component was used, which is obtainable under the name Grade B from H.C. Starck, Germany: specific surface=1.5 m²/g, O content=1.2% by weight, d-98 parameter <8 μm. This batch could no longer be completely densified, even under the considerably more intensive sintering conditions employed in test #9, and accordingly did not reach the criteria according to the invention. It can be deduced from this that for complete densification of the batches the $Si_3N_4$ and SiC raw materials must have d-98 parameters <2 μm and that of the TiN component must be <5 μm.

In test #11, an attempt was made to sinter base batch #10 into a dense product by a larger amount of sintering additive. This was in fact successful, but the mechanical properties and the oxidation-resistance in particular fell to a level considerably below that of the claims. This substantiates the requirement of a volume fraction of secondary phase of ≦15% by volume in order to obtain the properties according to the invention.

In order to analyse the effect of the characteristics of the TiN addition in more detail, in batch #6 the TiN was replaced by a nanofine TiN powder Typ H. Table 1 with a particle size of 100%<100 nm and an O content of 2.5% by weight (batch #12). Further preparation was effected as described in example 1. This batch exhibited excellent sintering behaviour under 1 bar $N_2$ and considerably exceeded the minimum properties defined according to the invention.

In a further test, batch #6 was modified by the use of an amorphous TiCN precursor (Typ X, Table 1) with a carbon content of 6% by weight and an oxygen content of 0.8% by weight. It was not meaningful to specify a particle size for this amorphous material, due to its amorphous character. This material (batch #13) could also be densified completely by sintering under 1 bar $N_2$ if a slower rate of heating was selected between about 1250° C. and the sintering temperature of 1780° C. The properties of the material exceeded the minimum values defined according to the invention. Batches #12 and #13 were distinguished by an extremely homogeneous distribution of the TiN phase; batch #13 still contained a low concentration of TiC in addition thereto.

Example 4 (batch no. #14, not according to the invention, #15 and #16 according to the invention)

In order to check the addition of TiN could be dispensed with completely and the requisite electrical conductivity could also be achieved by increased concentrations of SiC additive, in batch #14 the addition of SiC was increased to 30% by weight whilst retaining the process conditions described in example 1. The material was in fact sinterable, but did not attain the electrical conductivity specified according to the invention. A further increase of the SiC content to 40% by weight (batch #15) did fulfil this criterion, so that pure $Si_3N_4$-SiC batches with the specified sintering additives are also according to the invention. This positive result prompted the testing of a pure liquid phase-sintered SiC material (batch #16). As shown by the results in Table 1, this also fulfilled the specified criteria.

TABLE 1

(Composition of the examples evaluated and their (amounts used and) material properties)

| | | | | | | | Sentering Additive | | O cont adds | Total O anal. | O-cont SiN + SiC + TiN | $SiO_2$ | $TiO_2$ | Vol-fraction SiN + SiC + TiN | Vol-fraction adds | Sec. phase vol. |
|---|---|---|---|---|---|---|---|---|---|---|---|---|---|---|---|---|
| Test Nr. | $Si_2N_4$ wt-% | SiC wt-% | TiN Typ | wt-% | a | b | $Y_2O_3$ wt-% | $Al_2O_3$ (other) wt-% | wt-% | wt-% | wt-% | wt-% | wt-% | $cm^3$ | $cm^3$ | Vol. % |
| #1C' | 90.0 | — | — | — | 0 | 0 | 5.0 | 5.0 | 3.4 | 5.3 | 1.9 | 3.5 | — | 28.13 | 3.59 | 11.31 |
| #2C' | 70.0 | — | C | 20.0 | 0 | 0.22 | 5.0 | 5.0 | 3.4 | 5.2 | 1.8 | 2.3 | 0.9 | 25.58 | 3.39 | 11.70 |
| #3C' | 60.0 | — | C | 30.0 | 0 | 0.33 | 5.0 | 5.0 | 3.4 | 5.5 | 2.1 | 2.3 | 1.6 | 24.31 | 3.58 | 12.84 |
| #4C' | 50.0 | — | C | 40.0 | 0 | 0.44 | 5.0 | 5.0 | 3.4 | 6.1 | 2.7 | 2.5 | 2.7 | 23.03 | 3.96 | 14.67 |
| #5C' | 50.0 | 20.0 | C | 20.0 | 0.22 | 0.22 | 5.0 | 5.0 | 3.4 | 4.6 | 1.2 | 1.6 | 0.6 | 25.58 | 3.01 | 10.52 |
| #6 | 46.0 | 15.0 | C | 30.0 | 0.16 | 0.33 | 5.0 | 4.0 | 2.9 | 4.5 | 1.6 | 2.9 | 1.2 | 28.44 | 3.43 | 10.77 |
| #7 | 46.0 | 10.0 | C | 35.0 | 0.11 | 0.38 | 5.0 | 4.0 | 2.9 | 3.9 | 1.0 | 1.8 | 0.8 | 28.44 | 2.91 | 9.29 |
| #8 | 42.0 | 10.0 | C | 40.0 | 0.11 | 0.43 | 4.5 | 3.5 | 2.6 | 4.6 | 2.0 | 3.7 | 2.0 | 28.75 | 3.75 | 11.55 |
| #9 | 42.0 | 10.0 | C | 40.0 | 0.11 | 0.43 | 4.5 | 3.5 | 2.6 | 4.6 | 2.0 | 3.7 | 2.0 | 28.75 | 3.75 | 11.55 |
| #10C' | 42.0 | 10.0 | B | 40.0 | 0.11 | 0.43 | 4.5 | 3.5 | 2.6 | 4.2 | 1.6 | 3.0 | 1.6 | 28.75 | 3.36 | 10.45 |
| #11C' | 38.5 | 9.0 | B | 36.5 | 0.11 | 0.43 | 9.0 | 7.0 | 5.2 | 7.0 | 1.8 | 3.4 | 1.6 | 25.25 | 5.28 | 16.75 |
| #12 | 46.0 | 15.0 | H | 30.0 | 0.16 | 0.33 | 5.0 | 4.0 | 2.9 | 6.1 | 3.2 | 5.9 | 2.4 | 28.44 | 4.90 | 14.71 |
| #13 | 46.0 | 15.0 | X | 30.0 | 0.16 | 0.33 | 5.0 | 4.0 | 2.9 | 4.1 | 1.2 | 2.2 | 0.9 | 28.44 | 3.06 | 9.72 |
| #14C' | 60.0 | 30.0 | — | — | 0.33 | 0 | 5.0 | 5.0 | 3.4 | 4.8 | 1.4 | 2.6 | — | 28.13 | 3.23 | 10.31 |
| #15 | 50.0 | 40.0 | — | — | 0.44 | 0 | 5.0 | 5.0 | 3.4 | 5.1 | 1.7 | 3.2 | — | 28.13 | 3.45 | 10.92 |
| #16 | — | 90.0 | — | — | 1.00 | 0 | 5.0 | 5.0 | 3.4 | 5.3 | 1.9 | 3.5 | — | 28.13 | 3.59 | 11.31 |

| | Determined Materials Properties | | | | | | |
|---|---|---|---|---|---|---|---|
| Test Nr. | Sintered density $g/cm^3$ | RT-bend strength MPa | Klc- MPa* $*m^{1/2}$ | Hardness HV10 GPa | Oxidation 1000° C. $mg/cm^2$ | Oxidation 1300° C. $mg/cm^2$ | ELF S/m |
| #1C' | 3.24 | 940 | 6.7 | 15.2 | 0.1 | 0.4 | |
| #2C' | 3.46 | 780 | 6.3 | 15.6 | 0.4 | 2 | $2 * 10^{-10}$ |
| #3C' | 3.65 | 745 | 6.9 | 16.6 | 1.3 | 8 | $5 * 10^{-5}$ |
| #4C' | 3.78 | 685 | 7.2 | 16.6 | 2.5 | 8 | 0.4 |
| #5C' | 3.52 | 860 | 6.4 | 15.9 | 0.02 | 5 | $8 * 10^{-5}$ |
| #6 | 3.69 | 855 | 6.5 | 15.5 | 0.03 | 0.5 | 0.2 |
| #7 | 3.76 | 800 | 6.3 | 15.3 | 0.04 | 0.7 | 0.4 |
| #8 | 3.86 | 810 | 6.1 | 15.2 | 0.05 | 0.8 | 3.3 |
| #9 | 3.89 | 870 | 6.7 | 15.2 | 0.05 | 0.8 | 3.6 |
| #10C' | 2.85 | 410 | | | | | |
| #11C' | 3.75 | 730 | 5.4 | 14.2 | 0.30 | 4.0 | |
| #12 | 3.71 | 885 | 6.8 | 15.8 | 0.03 | 0.4 | 0.6 |
| #13 | 3.65 | 830 | 6.5 | 15.5 | 0.05 | 0.7 | 0.2 |
| #14C' | 3.24 | 845 | 6.4 | 16.2 | 0.04 | 0.5 | $2 * 10^{-6}$ |
| #15 | 3.25 | 840 | 6.3 | 16.4 | 0.04 | 0.4 | 0.1 |
| #16 | 3.26 | 810 | 6.1 | 16.8 | 0 | 0.1 | 15 |

C' = comparison example
ELF = electrical conductivity
Klc = fracture toughness
O—$Y_2O_3$ = 0.213
O—$Al_2O_3$ = 0.471

What is claimed is:

1. A liquid phase-sintered, electrically conducting and oxidation-resistant ceramic material having the composition:

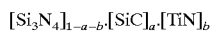

wherein a=0.1 to 1, b=0.05 to 0.5 and (a+b)≧0.4, and additionally sintering aids from the group consisting of $Y_2O_3$, rare earth oxides, $Al_2O_3$, $Sc_2O_3$, $TiO_2$ and $ZrO_2$, having a specific electrical conductivity at room temperature of ≧0.1 S/m and an oxidation-resistance characterized by a weight increase of ≦0.05 $mg/cm^2$ after exposure to air for 100 hours at 1000° C.

2. A material according to claim 1, wherein the weight increase after exposure to air for 100 hours at 1300° C. is ≦0.8 $mg/cm^2$.

3. A material according to claim 1, wherein the volume of the sintering additives, together with the volume of the $SiO_2$ resulting from the oxygen content of the $Si_3N_4$ powder and/or of the SiC powder used and together with the $TiO_2$ resulting from the oxygen content of the TiN powder used, amounts in total to ≦15% by volume of the sintered material, and at room temperature the material has an average bending strength of ≧800 MPa, a fracture toughness of ≧6 MPa . $m^{1/2}$ and a hardness HV 10 of ≧15 GPa.

* * * * *

UNITED STATES PATENT AND TRADEMARK OFFICE
CERTIFICATE OF CORRECTION

PATENT NO. : 6,156,238
DATED : December 5, 2000
INVENTOR(S) : Wotting, et. al.

It is certified that error appears in the above-identified patent and that said Letters Patent is hereby corrected as shown below:

Col. 1, line 42: Delete "$\geq 230\%$" and replace with - -$\geq 30\%$- -.
Col. 2, line 30: Insert an "equal" sign (=) between "b" and "0".
Col. 2, line 31: Delete "(" prior to the word "group".
Col. 2, line 32: Delete "$A_2O_3$" and replace with - -$Al_2O_3$- -.
Col. 2, line 41: Delete the period after "C".
Col. 2, line 50: Delete the period after "C".
Col. 3, line 15: Delete the period after "C".
Col. 3, line 16: Delete the period after "C".
Col. 3, line 46: Delete "1.1 1.2.5" and replace with - -1:1:2.5- -.
Col. 3, line 50: Delete the period after "C".
Col. 4, line 12: Delete the period after "C".
Col. 4, line 28: Delete "Stack" and replace with - -Starck- -.
Col. 5, line 12: Delete the period after "C".
Col. 6, line 24: Delete ", Table 1" and replace with - -(Table 1)- -.
Col. 6, line 41: Delete the period after "C".
Col. 8, line 52: Delete the period after "C".

Signed and Sealed this

First Day of May, 2001

*Attest:*

NICHOLAS P. GODICI

*Attesting Officer*     Acting Director of the United States Patent and Trademark Office